Figure 1:
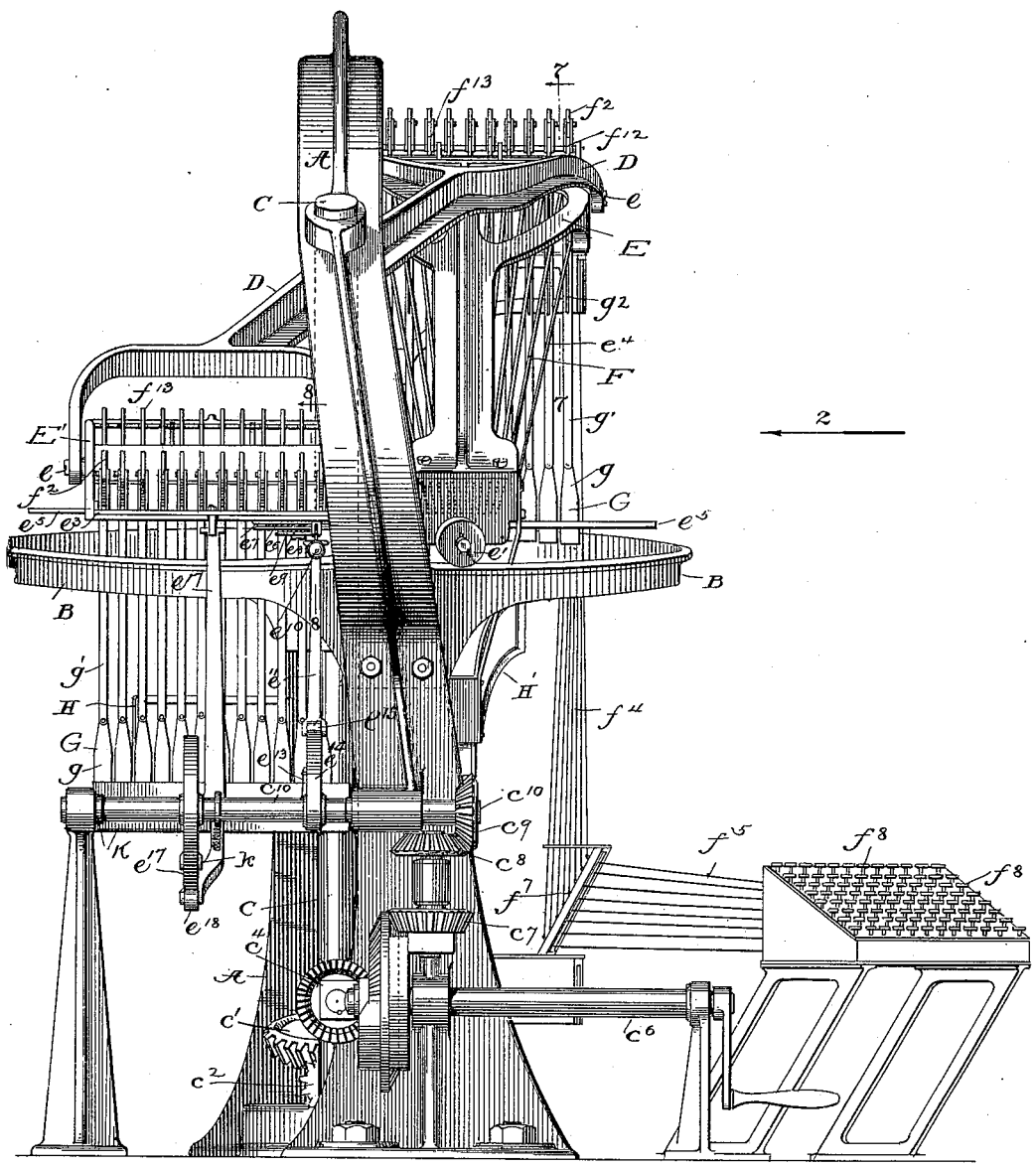

No. 614,229. Patented Nov. 15, 1898.
O. MERGENTHALER.
LINOTYPE MACHINE.
(Application filed Dec. 23, 1890.)

(No Model.) 13 Sheets—Sheet 1.

No. 614,229. Patented Nov. 15, 1898.
O. MERGENTHALER.
LINOTYPE MACHINE.
(Application filed Dec. 23, 1890.)
(No Model.) 13 Sheets—Sheet 2.

No. 614,229. Patented Nov. 15, 1898.
O. MERGENTHALER.
LINOTYPE MACHINE.
(Application filed Dec. 23, 1890.)
(No Model.) 13 Sheets—Sheet 4.

Witnesses:
Inventor:
Ottmar Mergenthaler
By his Atty
Phil. T. Dodge

No. 614,229. Patented Nov. 15, 1898.
O. MERGENTHALER.
LINOTYPE MACHINE.
(Application filed Dec. 23, 1890.)
(No Model.) 13 Sheets—Sheet 7.
Fig. 7.
on line 7-7
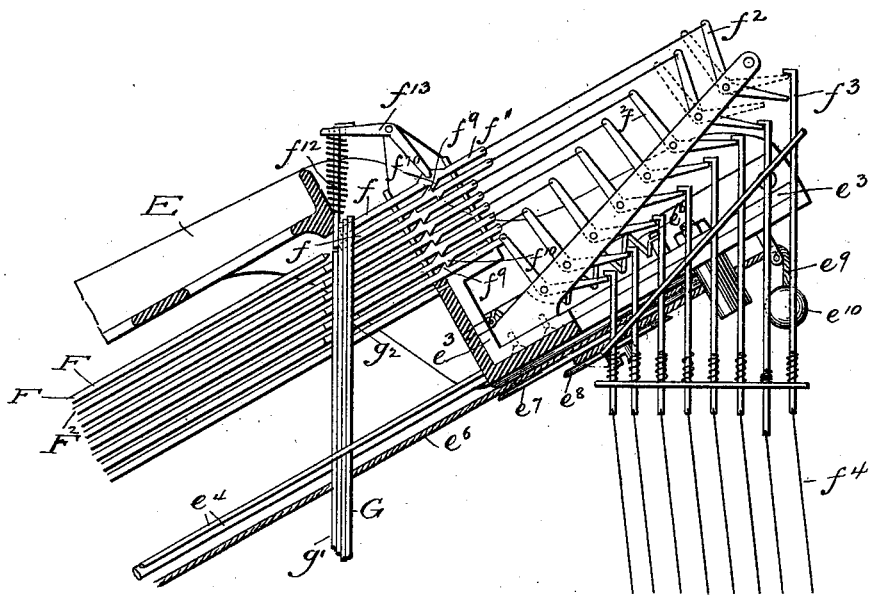
Key Mechanism
Selecting and Discharging
Matrix
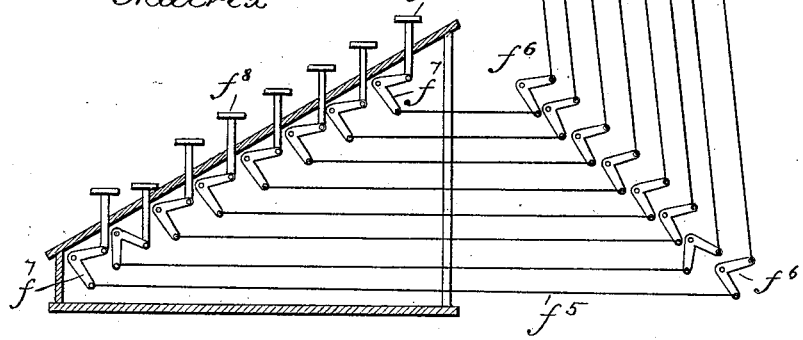
Witnesses:
W. W. Mortimer
W. R. Kennedy
Inventor:
Ottmar Mergenthaler
By his atty
Phil. T. Dodge

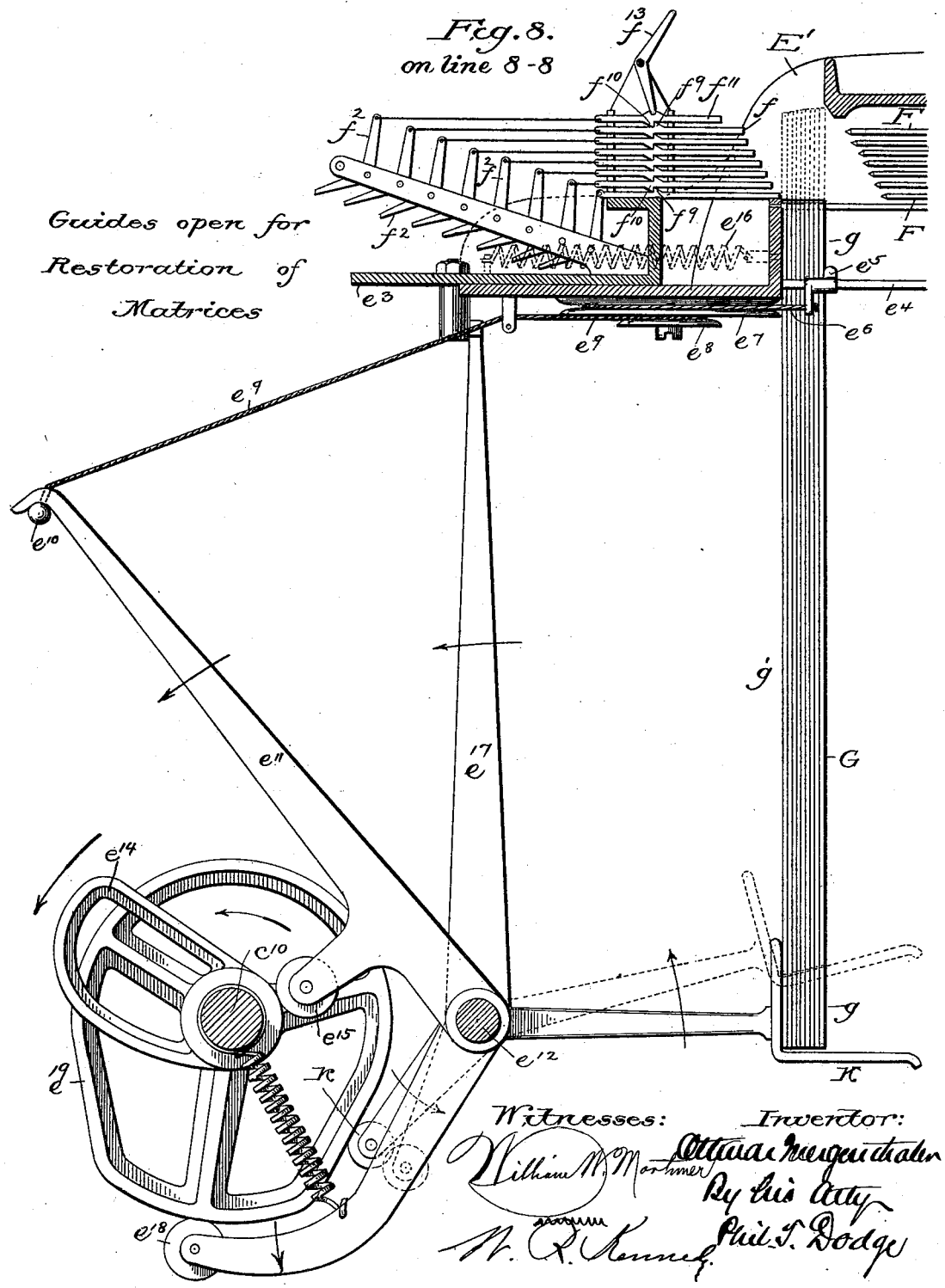

No. 614,229. Patented Nov. 15, 1898.
O. MERGENTHALER.
LINOTYPE MACHINE.
(Application filed Dec. 23, 1890.)
(No Model.) 13 Sheets—Sheet 9.
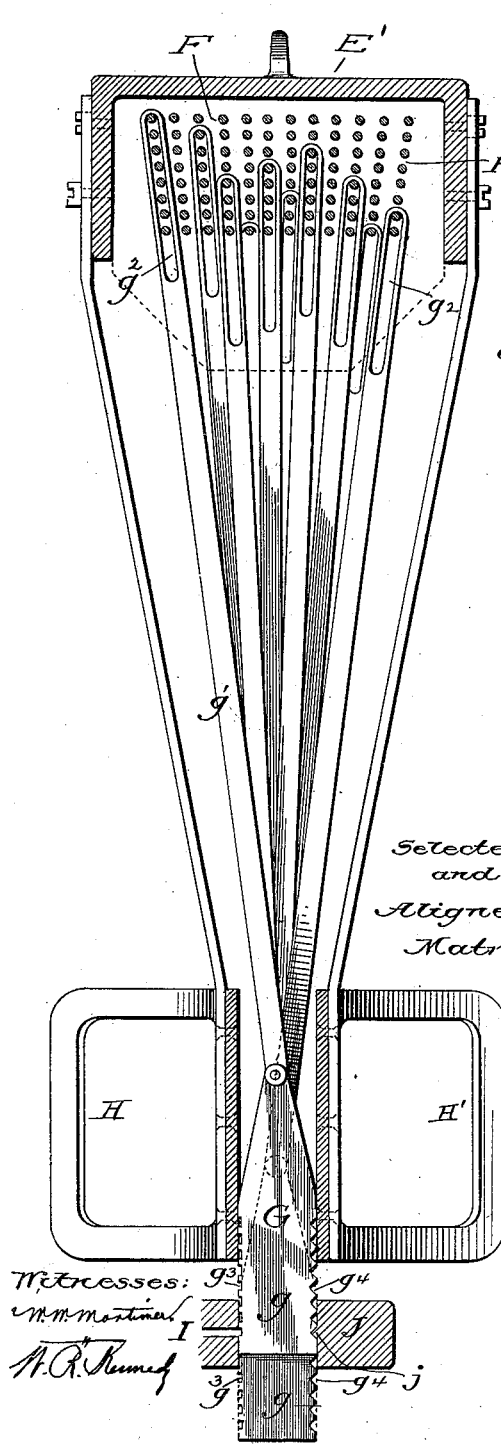
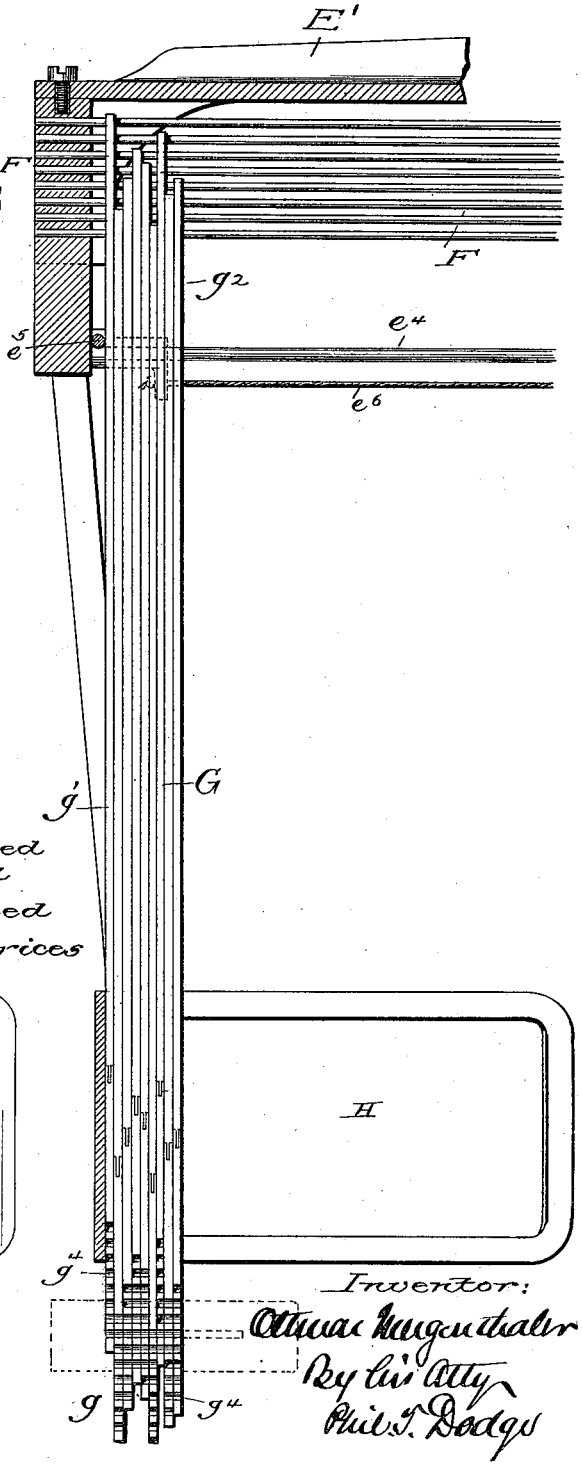

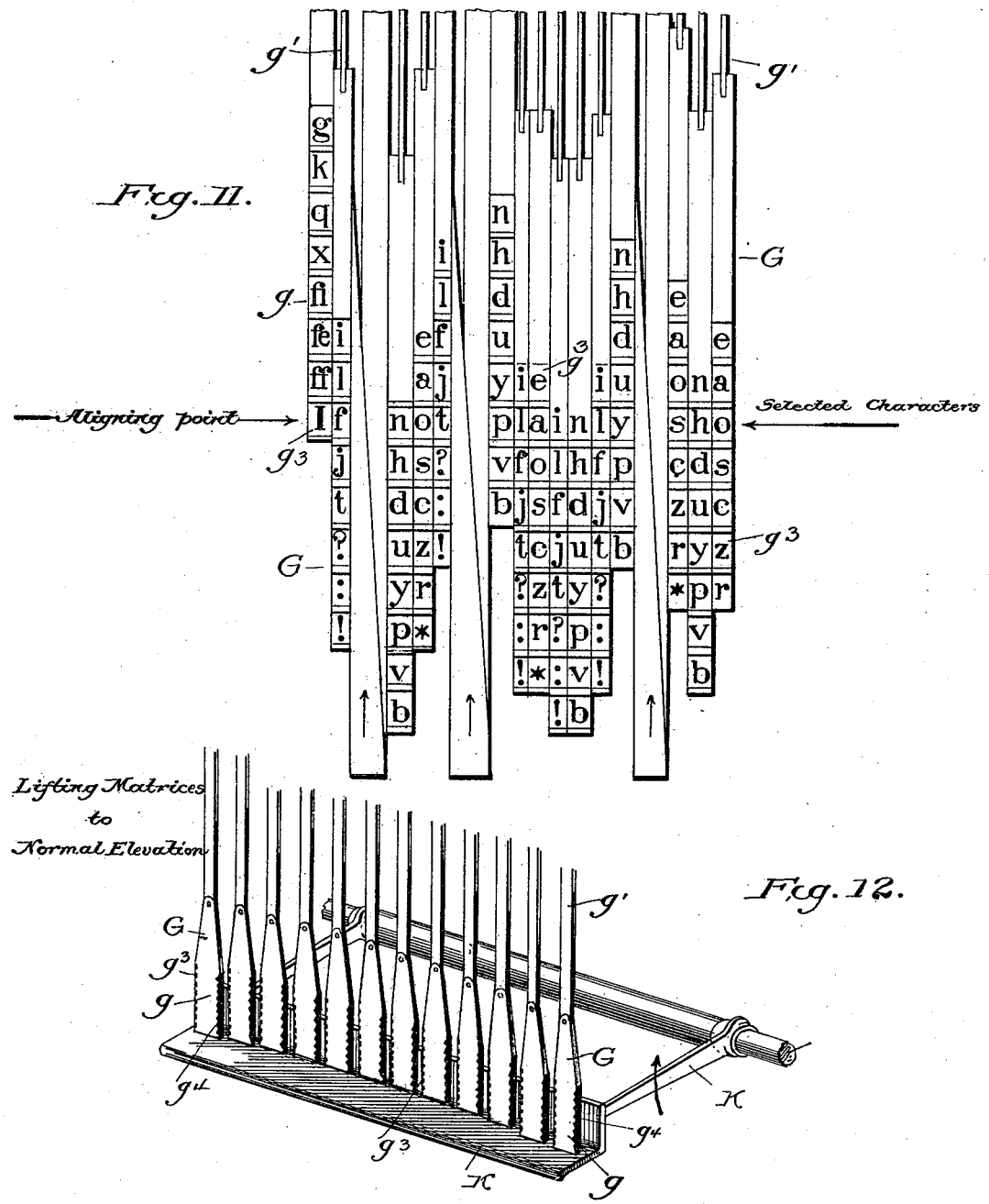

No. 614,229. Patented Nov. 15, 1898.
O. MERGENTHALER.
LINOTYPE MACHINE.
(Application filed Dec. 23, 1890.)
(No Model.) 13 Sheets—Sheet 11.
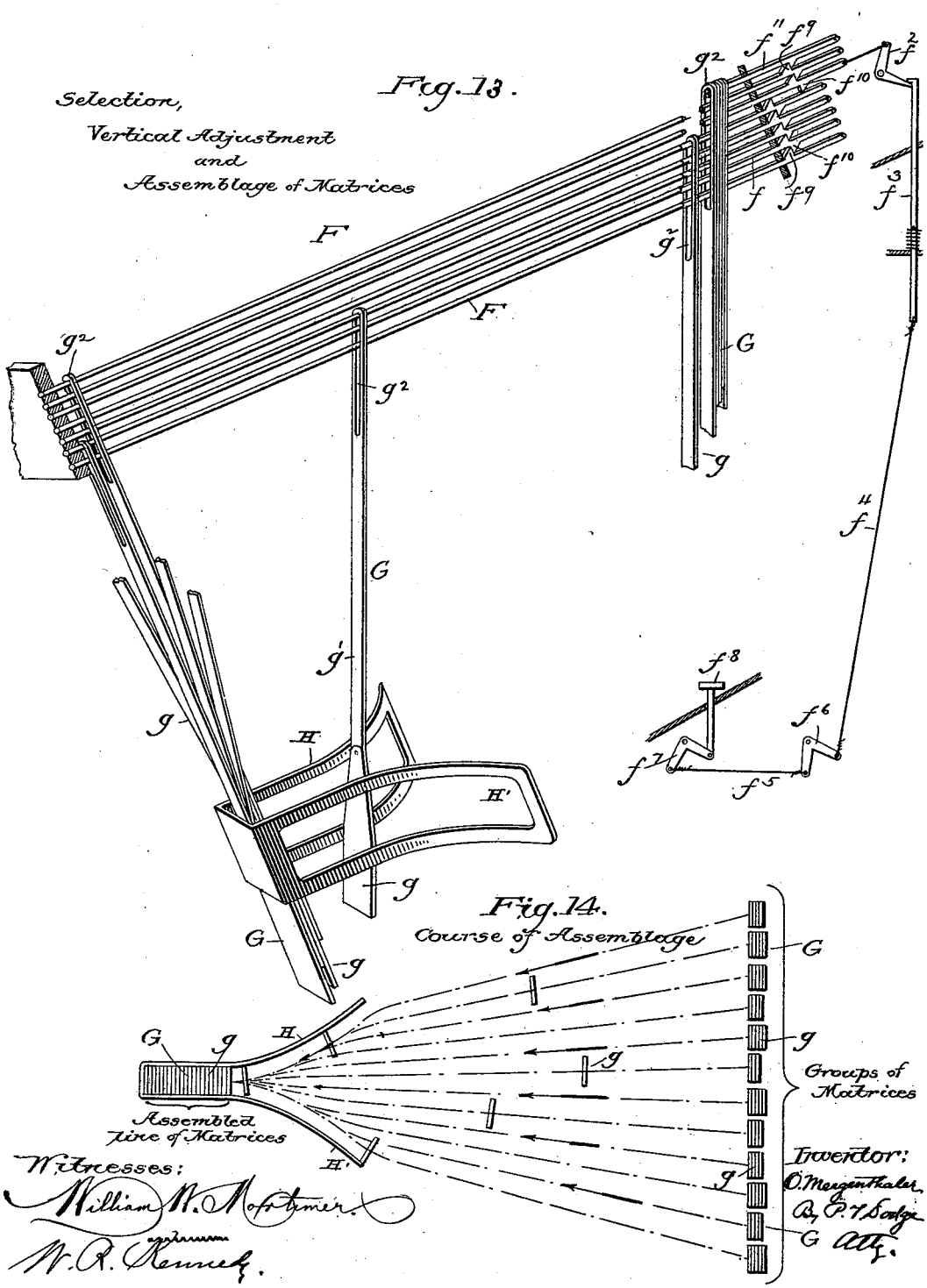

No. 614,229. Patented Nov. 15, 1898.
O. MERGENTHALER.
LINOTYPE MACHINE.
(Application filed Dec. 23, 1890.)
(No Model.) 13 Sheets—Sheet 12.

Witnesses:
William W. Mortimer
W. R. Kennedy

Inventor:
Ottmar Mergenthaler
By his Atty
Phil T. Dodge

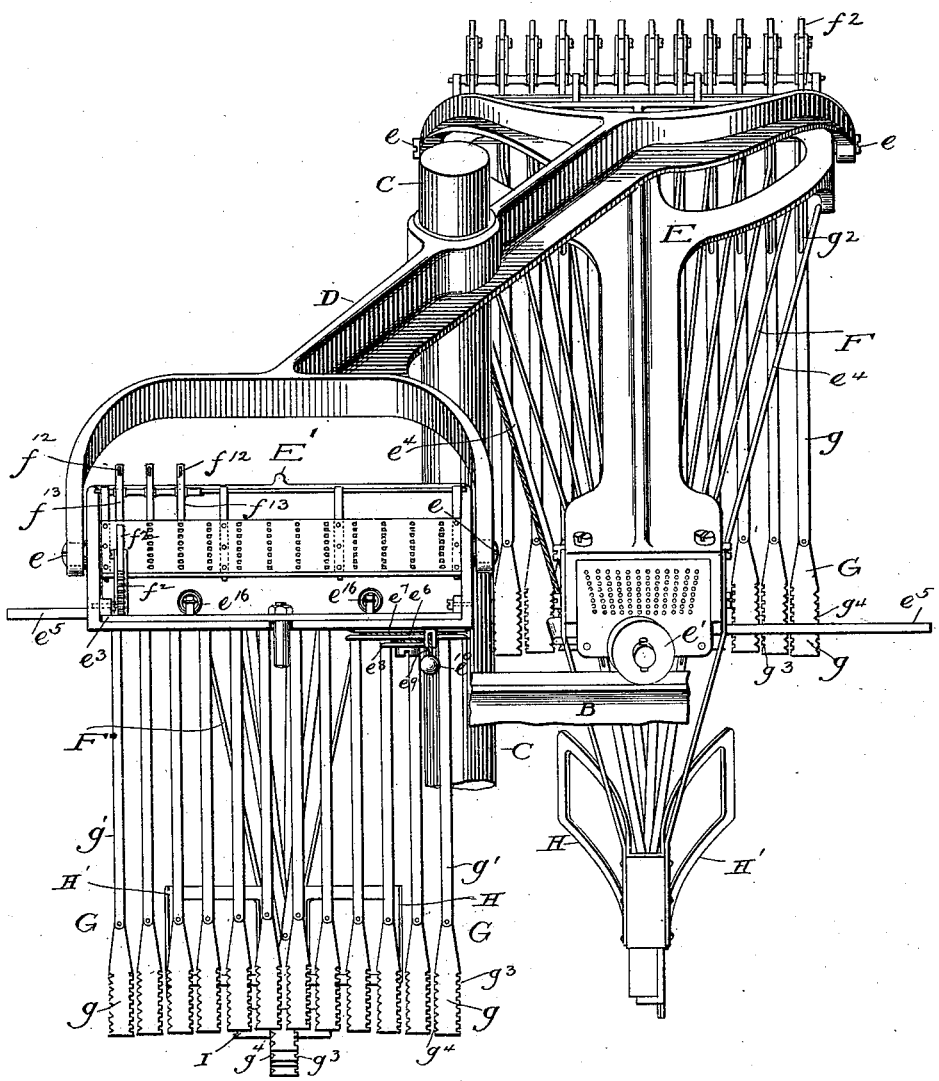

UNITED STATES PATENT OFFICE.

OTTMAR MERGENTHALER, OF BALTIMORE, MARYLAND, ASSIGNOR, BY MESNE ASSIGNMENTS, TO THE MERGENTHALER LINOTYPE COMPANY, OF NEW JERSEY.

LINOTYPE-MACHINE.

SPECIFICATION forming part of Letters Patent No. 614,229, dated November 15, 1898.

Application filed December 23, 1890. Serial No. 375,632. (No model.)

*To all whom it may concern:*

Be it known that I, OTTMAR MERGENTHALER, of the city of Baltimore, in the State of Maryland, have invented certain Improvements in Linotype-Machines, of which the following is a specification.

This invention relates to mechanism for selecting and assembling or composing in line type-matrices or type-dies for use in connection with a linotype-casting mechanism or with mechanism for effecting an impression in papier-mâché or other material from which to cast linotypes or stereotypes by a subsequent operation. The improvements are intended more particularly for use in what are now known in the art as "linotype-machines," wherein a series of type-matrices, each representing a single character, are temporarily assembled in line, together with suitable intervening spaces, and the line then employed to close momentarily the side of a mold which is automatically filled with molten metal, thereby producing a linotype or type-bar bearing in relief the characters to print an entire line of a page or column. I have therefore represented my invention as embodied in a machine of this character; but it is to be distinctly understood that the same composing mechanism may be used with male type or type-dies as well as with matrices and that the assembled line, whether of matrices or dies, may be used either with a casting mechanism using molten metal or with mechanism for presenting to the line cold metal bars, plastic material, papier-mâché, or any other material adapted to the production of printing-type or matrices therefor.

The primary aim of this present invention is to produce a machine in which a small number of matrices may be used to produce a large number of characters, and this in order to avoid the necessity of handling a great number of parts and admit of the machine being put into simple and compact form. To this end I make use of matrices each of which bears in one edge a number of independent characters or matrices proper less than the entire number represented in the keyboard, so that when these matrices are assembled side by side in a row or line they are adjusted endwise in relation to each other, and thus the selected characters, one on each matrix, brought into a common line for conjoint use. I commonly provide each matrix with eight characters and make use of twelve different styles—that is to say, matrices bearing twelve different groups of characters—thus adapting the machine to produce ninety-six characters; but the number of characters may be varied at will. In connection with the matrices I propose to make use of an assembling or composing mechanism controlled by finger-keys or otherwise for the purpose of selecting the matrices bearing the appropriate characters in the order in which the characters are to be printed and guiding or transporting such selected matrices from their holders, magazines, or storage devices to the alining or assembling point and adjusting the matrices endwise in relation to each other to bring the requisite characters thereon in line.

In order to admit of the machine being operated with great rapidity and to avoid the loss of time which would result from the necessity of composing, using, and distributing one line before commencing the composition of another, I provide the machine with independent and duplicate sets of matrices and composing mechanisms, the latter arranged to operate alternately in connection with one and the same finger-key mechanism. I also organize the machine in such manner that while a line of matrices is being composed by its appropriate mechanism the previously-composed line of the other composing mechanism is presented to the mold or impression devices and thereafter distributed.

I prefer to use as a means of suspending the matrices and guiding them in their course from the storage-points to the point of assemblage wires on which the matrices slide; but it is to be understood that any equivalent guides may be used in connection with the duplex organization above referred to.

I have represented in the accompanying drawings the details of construction and arrangement which I find best adapted for general use; but it will be apparent to the skilled mechanic that my invention extends beyond such details and that it may be embodied in many forms mechanically equivalent.

Figure 2:
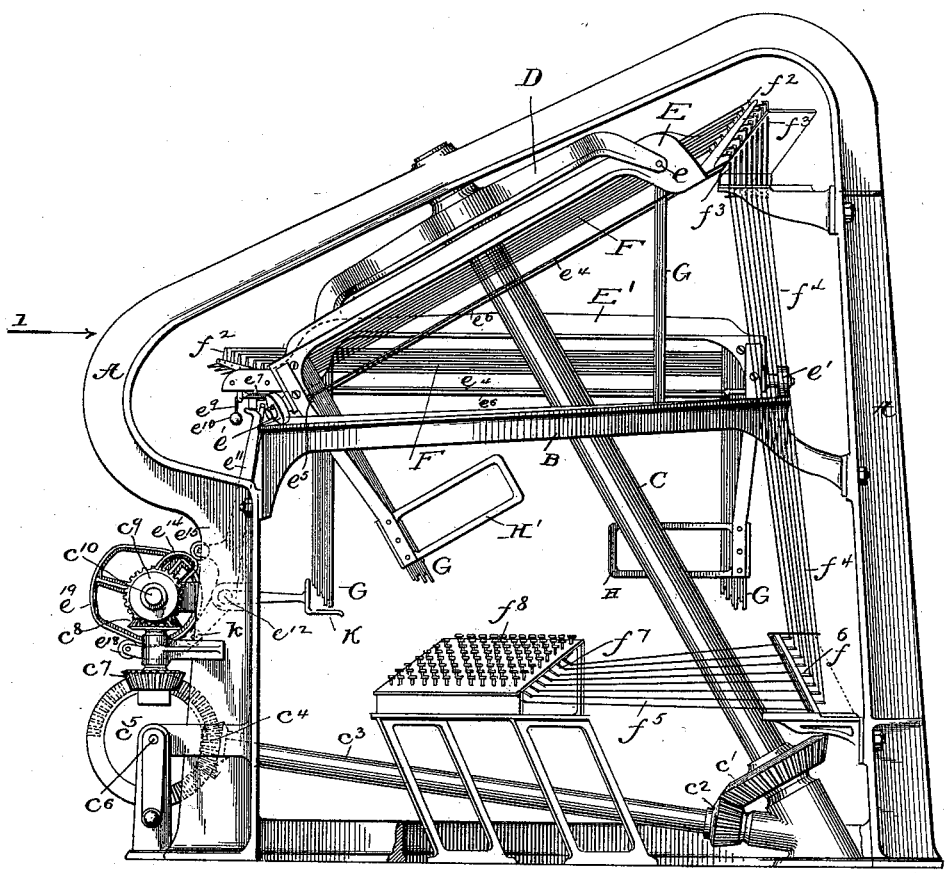
Figure 3:
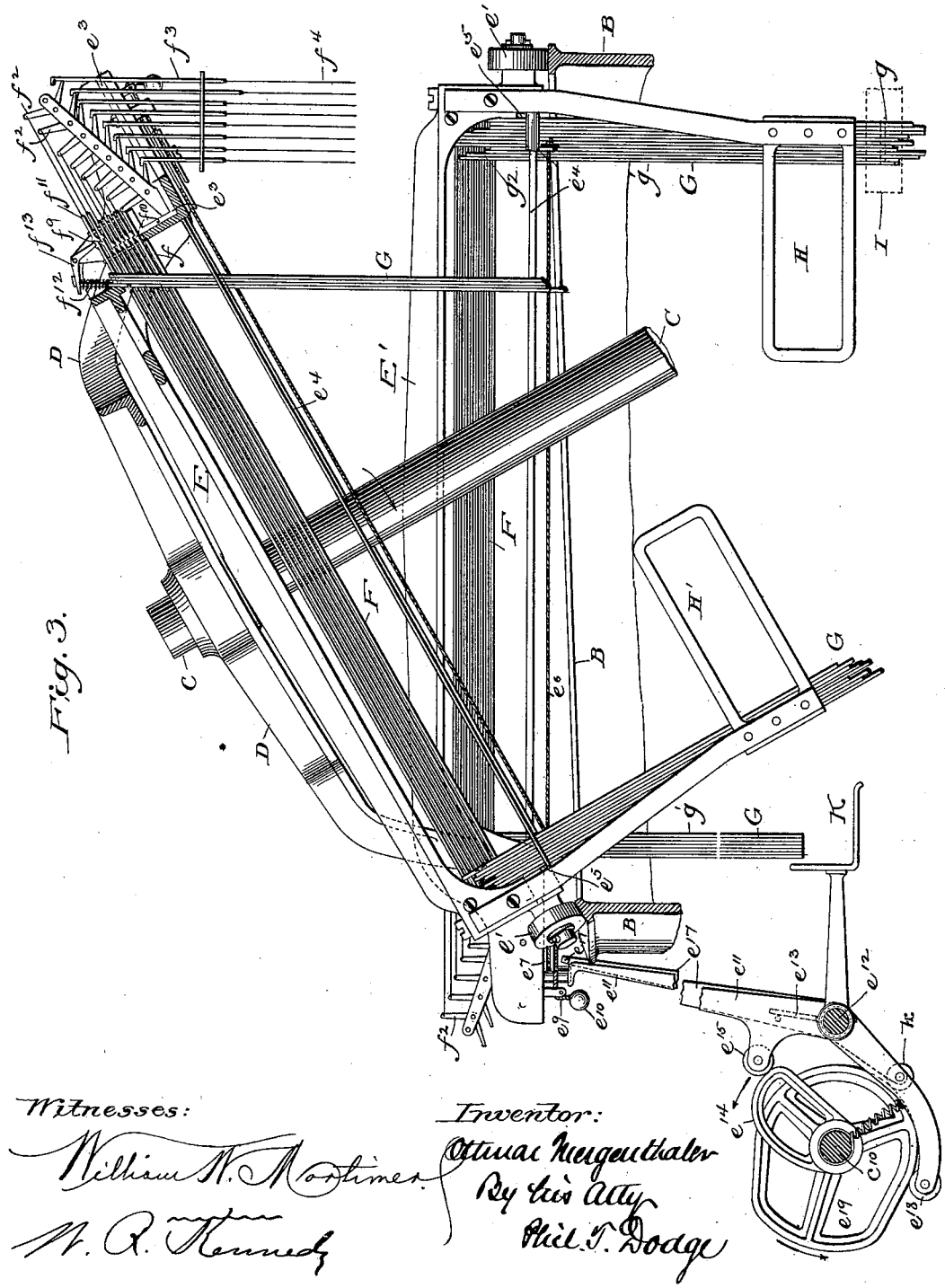
Figure 4:
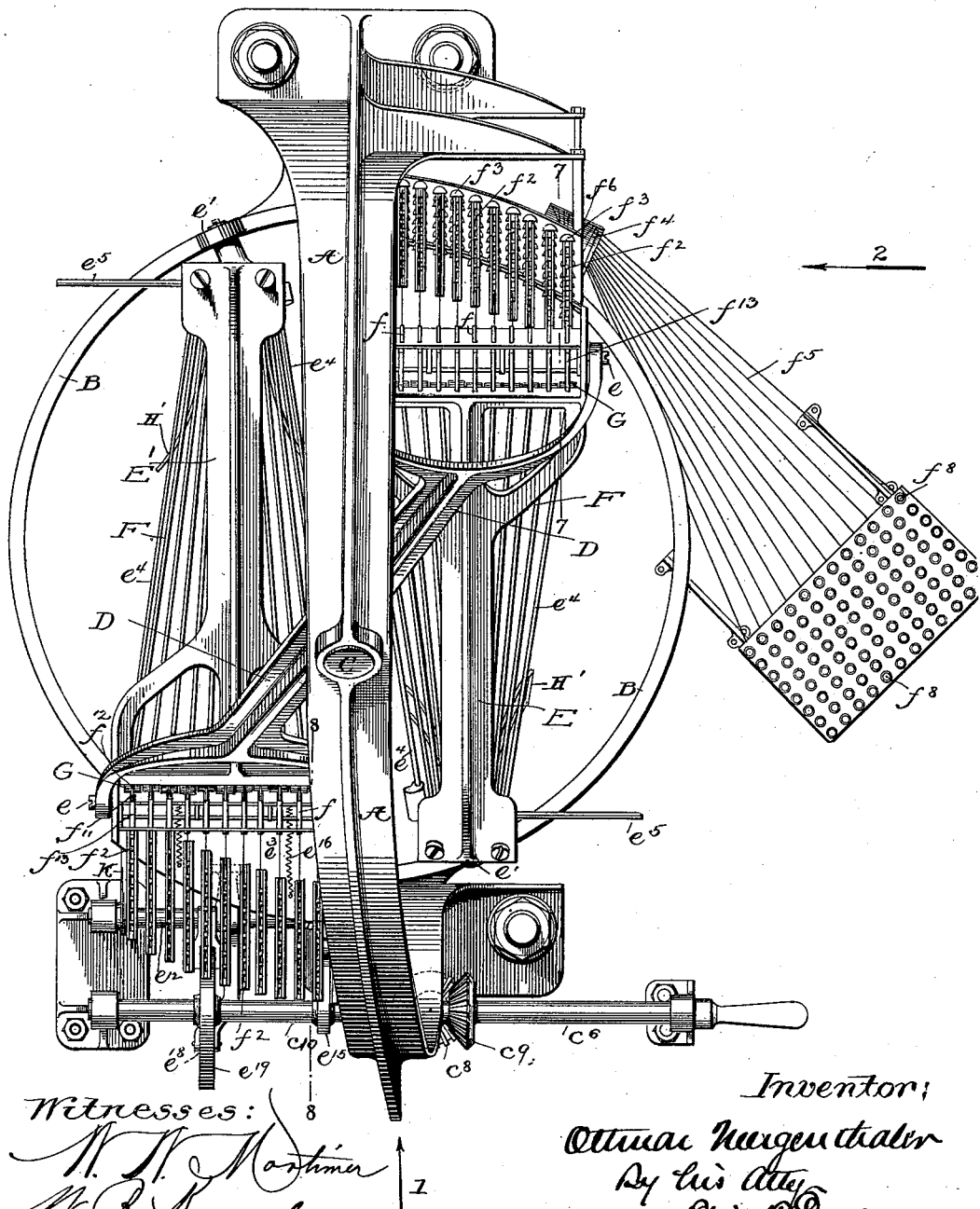
Figure 5:
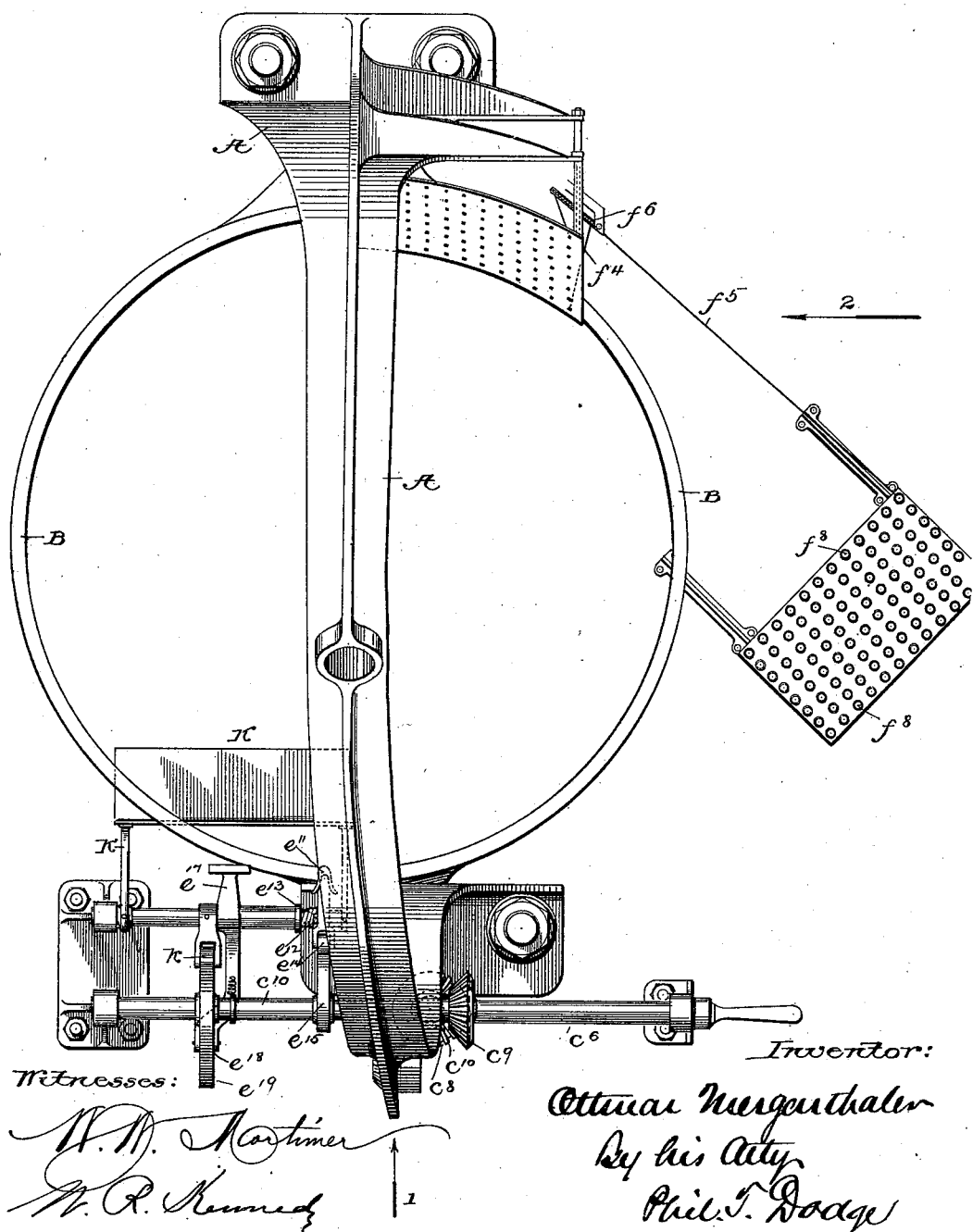
Figure 6:
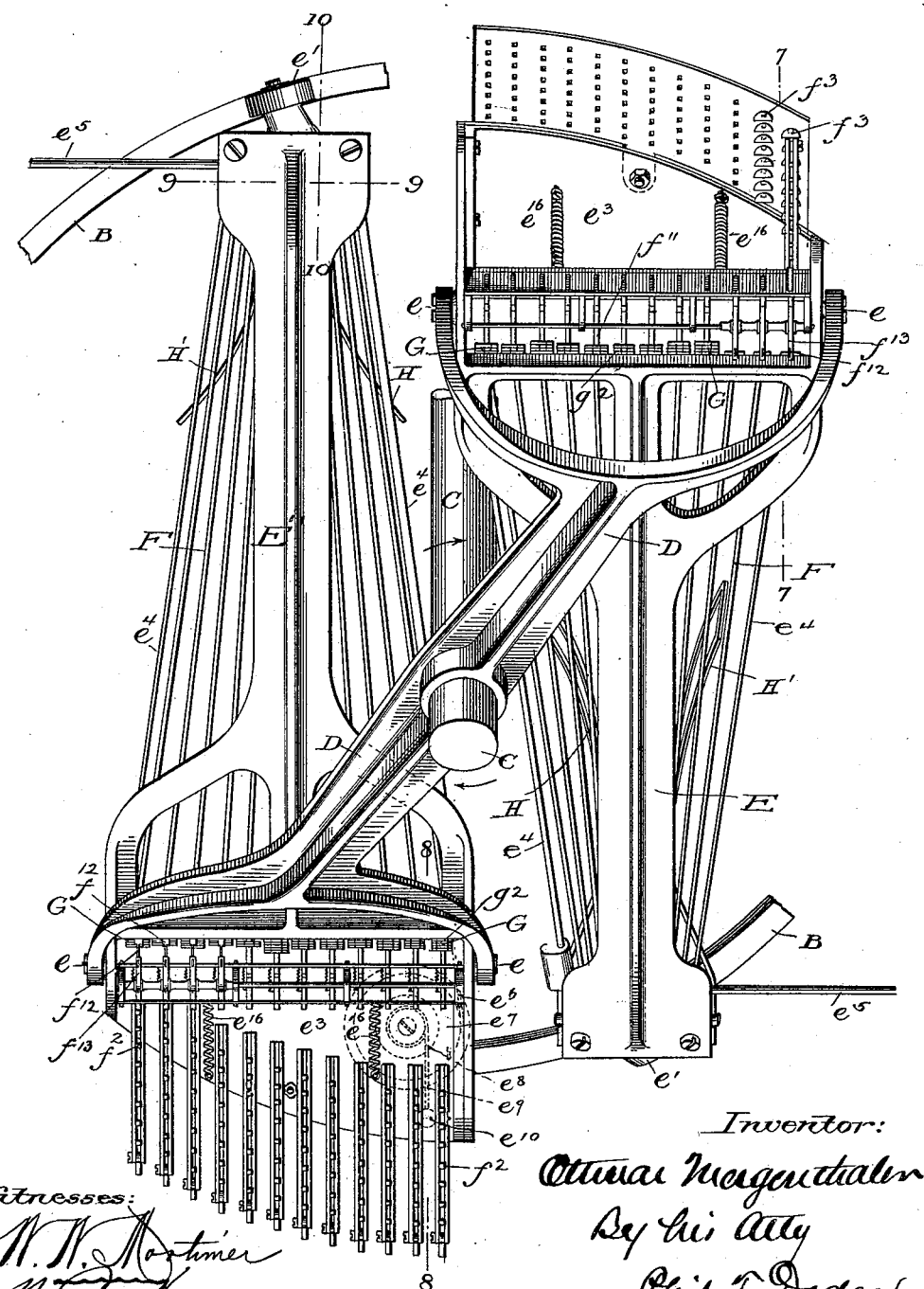
Figure 16:
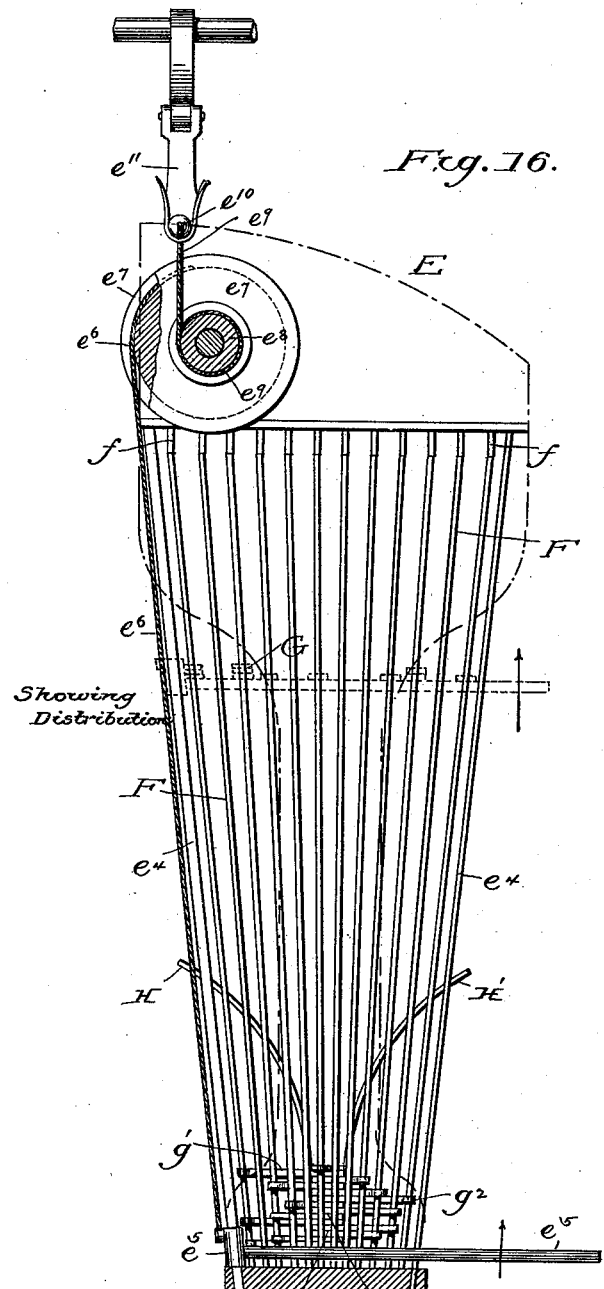
Figure 15:
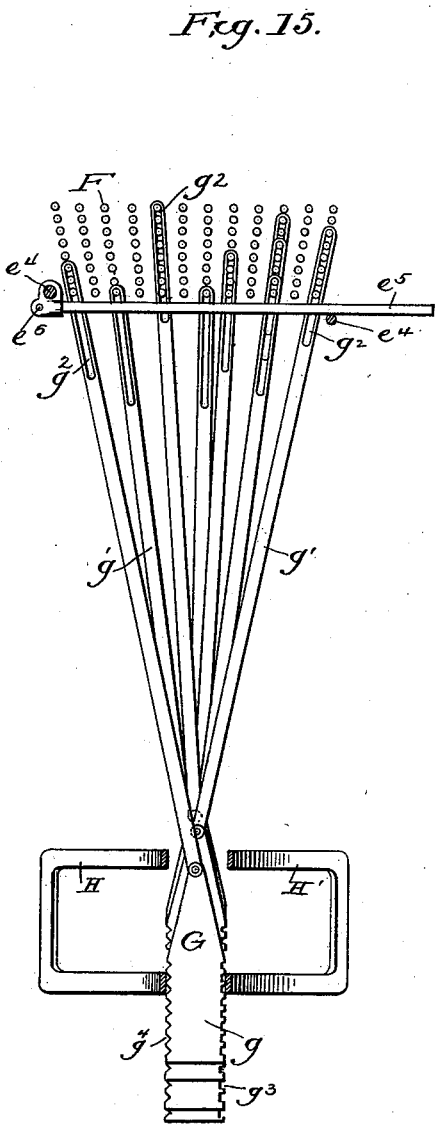

In the accompanying drawings, Figure 1 is a front elevation of my entire mechanism for selecting, assembling, and alining the type-matrices, looking in the direction of the arrow 1 in Figs. 2, 4, and 5. Fig. 2 is a side elevation of the mechanism, looking in the direction of the arrow 2 in Figs. 4 and 5. Fig. 3 is a side elevation looking in the direction of the arrow 2 in Figs. 1, 4, and 5, showing the upper parts of the mechanism for selecting and assembling the matrices, the frame-work and other portions being broken away in order to expose the operative parts to view. Fig. 4 is a top plan view of the entire mechanism. Fig. 5 is a plan view of the main frame and other principal parts. Fig. 6 is a plan view of the matrix supporting and assembling devices, the main frame being broken away. Fig. 7 is a vertical cross-section on the line 7 7 of Figs. 1, 4, and 6. Fig. 8 is a cross-section on the line 8 8 of Figs. 1, 3, and 6. Figs. 9 and 10 are vertical sections, respectively, on the lines 9 9 and 10 10 of Fig. 6. Fig. 11 is an edge or face view of a series of matrices with their characters selected and alined. Fig. 12 is a perspective view illustrating the manner in which the assembled matrices are lifted to their normal support. Fig. 13 is a perspective view of one tier of guide-arms and attendant parts, showing the manner in which each matrix is caused to present its selected character in the line. Fig. 14 is a top plan view showing in a diagrammatic way the course of the matrices in different paths to a common line at the assembling-point. Fig. 15 is a front elevation showing the several tiers of guide-wires and the matrices thereon, the distributing-arm, and adjacent parts. Fig. 16 is a top plan view of the parts represented in the preceding figure. Fig. 17 is an elevation showing the principal parts of the assembling or composing mechanism, the main frame and other parts being removed to expose them to view.

Referring to the drawings, A represents a rigid main frame of any form adapted to sustain the operative parts; B, an annular approximately horizontal track bolted rigidly to the frame; C, an inclined intermittingly-rotated shaft sustained in fixed bearings in the frame; D, a cross-head with forked ends secured firmly to the shaft, so that it is revolved in a plane oblique to the plane of the track; E E', two matrix-sustaining frames lying on opposite sides of the shaft and connected by horizontal pivots $e$ at one end to the respective ends of the cross-head and each provided at the free end with a sustaining-roller $e'$, arranged to travel on the annular track; F F, Fig. 3, matrix-sustaining wires, a number of which are secured in each of the frames E E', and G G the matrices, having their upper ends slotted, Fig. 13, and mounted to slide along the sustaining-wires from the storage-point at one end to the assembling-point at the other end, as hereinafter more fully explained. As the cross-head revolves it carries the two matrix-frames E E' in circular paths bodily around the shaft. As the ends of the yoke in the course of their revolution have a rising-and-falling motion in relation to the track, they serve to raise and lower the pivoted ends of the matrix-frames while they are being revolved, so that each frame and its wires during the course of the revolution are caused to assume at one side of the machine an inclined position, as in the case of the frame E, Figs. 1, 2, 3, 6, 7, and 13, and thereafter on reaching the opposite side of the machine to assume a horizontal position, as appears in the case of the frame E' in Figs. 1, 2, 3, 4, 6, 8, 9, 10, and 17. Thus it is that the combined rotating and tipping motion of the matrix-frames causes the matrix supporting and guiding wires to assume an inclined position in order to facilitate the descent of the matrices thereon to the assembling-point and thereafter turn to the opposite side of the machine and assume a horizontal position to sustain the assembled matrices in operative position, as will be more fully explained.

Each matrix G consists, as shown in Figs. 9, 10, and 13, of the matrix-plate $g$ and its suspending-arm $g'$, pivoted at the lower end to the plate and slotted at the upper end $g^2$ to receive the sustaining-wires. The matrix-plate $g$ is simply a flat metal plate having in one edge a series of different intaglio characters or matrices proper, $g^3$, arranged one above another, and having in the opposite edge a corresponding number of notches $g^4$. All the characters in the plate should be of practically the same width as the edge of the plate, so that when a number of matrices are assembled side by side in line their characters will stand in close order, as demanded in print. I find it sufficient in practice to adapt the machine for the production of ninety-six different characters, and to this end I provide each matrix-plate with eight characters and provide twelve distinct forms of plate—that is to say, plates having twelve different sets of characters. Of each form of plate I provide a number equal to the number of times that a given character will occur in any line of print. For convenience of reference I will hereinafter designate all the matrices of one form—that is to say, those bearing the same characters—as a "group." The machine contains, it will be understood, twelve of these groups. As each matrix contains several characters, it is necessary in order to get the selected characters in line not only to select and bring together side by side the matrices bearing the required characters, but also to adjust the matrices endwise in relation to each other, so as to bring the appropriate characters, one on each matrix, in a common line. This is accomplished as the matrices slide downward over the wires toward the assembling-point in the manner shown in Figs. 2, 4, 7, 9, 10, and 13 by passing through the slotted end of all the matrices in a group a number of sustaining and guiding wires F F, &c., arranged one above another in a vertical row or tier, and by dividing or severing each of these wires (except the lowest) near its upper end and arranging the upper end $f$, Fig. 13, to slide backward momentarily in its support, in order to leave between the two parts of each wire an opening through which the matrix may descend in order that it may slide upon the wire next below. The height of the matrix on arriving at the lower end of the wires will depend on which of the wires it slides upon. The wires in each rank equal in number the characters on each matrix, so that by dropping the matrix from one wire to another it may be caused to present any desired one of its characters at the alining-level. If the matrix slides on the top wire, its lowest character will be presented. If it slides over the next lower wire, it will present the character next the bottom, and so on throughout the series. The retractile ends $f$ of the wires are connected, respectively, as shown in Figs. 1, 2, 4, 5, and 7, with elbow-levers $f^2$, pivoted in the matrix-frame and engaging beneath lips on the upper ends of vertical slides $f^3$, mounted in the main frame, and in turn connected by wires $f^4 f^5$ and levers $f^6 f^7$ with finger-keys $f^8$, each representing a distinct letter or character, so that whenever a finger-key is depressed it retracts the corresponding wire $f$. Each of these sliding wires except the lowest has a top shoulder $f^9$, engaging a shoulder $f^{10}$ on the wire next above, so that whenever a finger-key is actuated to withdraw a wire it causes all the wires above to move back therewith, thus affording a free passage for the matrix from the top wire through the intermediate wires to the one selected for use. All the matrices in a group are suspended and held normally in storage on the short sliding wire $f^{11}$, mounted in the frame above the other wires and connected to a finger-key, and are prevented from escaping by the end of the frame E, against which the first matrix bears. As shown in Figs. 3 and 7, a vertically-sliding finger $f^{12}$ is connected by lever $f^{13}$ with the sliding storage or magazine wire $f^{11}$. When, therefore, the wire $f^{11}$ is retracted, which results from the operation of any key in the series, the foremost matrix is permitted to escape and descend over the inclined wires to their lower ends, its escape being insured by the descent of the slide $f^{12}$. In Fig. 7 it will be seen that a spiral spring is interposed between the lever $f^{13}$ and matrix-delivery slide $f^{12}$, so that before the slide is released by the withdrawal of the wire $f^{11}$ from under it the spring is put under compression by lever $f^{13}$. When, therefore, the wire is drawn back far enough to release the matrix, the spring drives the slide $f^{12}$ down suddenly, thus ejecting or driving the matrix down from the storage-point very quickly and consequently allowing a rapid manipulation of the keys to discharge the successive matrices. The upper end of the slide $f^{12}$, having a head thereon, passes loosely through and is guided by the end of the lever $f^{13}$. It will of course be understood that the matrix thus discharged will descend to a greater or less extent and slide over one or another of the wires according as one or another of the finger-keys is actuated.

The foregoing description relates simply to the wires and finger-key connections for one group of matrices. It is duplicated or repeated for each group, the wires being divided, as shown in Fig. 9, into as many vertical tiers or rows as there are groups of matrices in the frame.

The devices above described serve to permit matrices containing the required characters to slide downward to the lower end of the frame, and also serve to determine the height at which the matrices stand in relation to each other on arriving at the lower end. As, however, the matrices of the different groups would hang in different vertical planes and out of line with each other on arriving at the lower ends of their respective wires, it is necessary to gather them edgewise into a row or line as they descend, and this is accomplished by fixing to the lower end of the matrix-frame two gathering-arms H H', Fig. 13, their upper ends being spread apart, while their lower ends are parallel, so that as the matrices descend one after another they will enter between these arms and be deflected right and left into a straight line between the parallel portions of the arms, as plainly shown in Figs. 2, 4, 9, 10, and 14.

In order to assemble the matrices representing all the characters for a line of print, it is only necessary to touch the keys representing the proper characters. It may happen that the successive matrices will come from different groups or that successive matrices will belong to the same group but be delivered in the line at different heights, so as to present different characters.

I have thus far described the details of one matrix-frame and its connections. The frame on the other side of the machine is in all respects a duplicate of the one just described.

After a line of matrices has been composed on the wires which are for the time being inclined the cross-head D is given a half-revolution, the effect of which is to carry the frame containing the assembled line of matrices into a horizontal position at the opposite side of the machine and to bring the second set of wires in an inclined position in the place previously occupied by the first set. In other words, the two sets of wires are caused to exchange positions.

The levers $f^2$ are carried with the matrix-frame out of engagement with the operating-slides $f^3$, which remain at rest in the main frame, so that the levers $f^2$ of the second matrix-frame are in turn brought into position to be operated by the slides $f^3$. It will be observed that under this arrangement the one set of finger-keys and finger-key connections are enabled to operate the matrix-releasing devices of the two matrix-frames alternately.

By the use of two sets of matrices independently operated I am enabled to compose a line of matrices in one frame during the operation of casting from the assembled line in the other frame. The assembled line is by the rotation of the frame containing it presented, as shown in Figs. 4 and 9, against and across the open side of a mold I, which will be supplied with molten metal from a melting-pot by a pump or other forcing mechanism of any suitable character—such, for example, as that represented in Letters Patent of the United States Nos. 313,224 and 436,532. The matrices thus presented to the mold serve to close its side and to present to the molten metal the selected and alined characters, which operate to form corresponding raised type on the linotype or printing-bar produced in the mold. The selected characters are held in exact alinement and the series of matrices held tightly against the edge of the mold by a confining-bar J, extending across the rear edges of the matrices and provided with a rib $j$ to enter the notches in their rear edges. It is to be distinctly understood, however, that the mold and clamping devices may be of any suitable construction and that in place of the mold impression devices or other devices of any suitable character may be used in connection with the alined surface. It is also to be understood that the plates $g$ instead of having intaglio characters may be provided with cameo characters to produce impressions in papier-mâché or other suitable material.

After the alined matrices have been used it is necessary that they shall be restored to the uppermost of the sustaining-wires and returned over said wires to the original point, which for convenience I have designated the "storage-point." Both of these operations may be automatically effected while the wires are in their horizontal position by mechanism such as shown in Figs. 1, 2, 4, and 8. Each matrix-frame is provided, as shown in Figs. 2, 4, 6, 15, and 16, with two longitudinal guide-wires $e^4$, supporting a transverse sliding arm $e^5$, Figs. 8 and 16, hereinafter called the "distributer-arm." When the wires are inclined, this slide stands at the lower end, as shown in Fig. 4, so that the line of matrices is assembled against it, as seen in Figs. 2, 4, 15, and 16. The distributer-arm is connected by a cord $e^6$ to a winding-pulley $e^7$, fixed to a smaller winding-pulley $e^8$, from which a cord $e^9$ passes through a suitable guide to a ball or enlargement $e^{10}$ on its end. A lever $e^{11}$, having a forked upper end to engage the ball, is mounted on a horizontal fulcrum $e^{12}$ and urged constantly outward by a spring $e^{13}$. A cam $e^{14}$ acts against a roller $e^{15}$ on the arm and limits its outward motion. At the proper time after the matrices have been used the cam $e^{14}$ releases the arm $e^{11}$, which is urged outward by the spring, so that it engages the enlargement $e^{10}$ and through the cord $e^9$ rotates the winding-pulleys, which in turn cause the entire line of matrices to slide along the horizontal wires toward the end from which they started. On reaching this end it is necessary that the matrices shall be lifted in order to restore them to the uppermost wire $f^{11}$. This is accomplished as follows: Each matrix-frame has all its levers $f^2$ and wires $f$ mounted, as shown particularly in Fig. 8, in a supplemental sliding frame $e^3$, seated within and guided by the sides of the matrix-frame, as shown in Figs. 6 and 17, so that they may all be retracted at one operation in order to leave open spaces through which the upper ends of all the matrices may be lifted to the wire $f^{11}$. This supplemental frame, urged inward by a spring $e^{16}$, is drawn back at the proper time by a lever $e^{17}$, Fig. 8, operated through a roller $e^{18}$ on its end by a cam $e^{19}$. In order to lift the matrices after the way is thus opened for them, I employ a vertically-swinging arm K, one end of which stands in position below the line of matrices, while the opposite end is provided with a roller $k$, acted upon by the cam $e^{19}$. The cams are so timed that the actions occur in the following order: First the distributer-arm is drawn to the left from the position shown in Fig. 8, so as to carry all the matrices in the line over the horizontal wires toward their storage position and so that their lower ends stand above the arm K. At or about the same time the supplemental frame $e^3$ is drawn back to afford an opening through the wires. During the maintenance of this opening the arm K swings upward and lifts all the matrices to their highest elevation. While they are thus maintained, the supplemental frame $e^3$ moves inward to its original position, rejoining the wires and leaving the matrices suspended on the top wire $f^{11}$. This completes the distribution, so that at the next revolution of the machine the wires are brought again into connection with the finger-key mechanism and into inclined positions with the matrices at their upper ends preparatory to their being again selected and assembled in line.

It will be perceived that the operations of assembling the matrices in one frame and of distributing them in the other are carried on independently and concurrently.

The operation of the mechanism as a whole is connectedly as follows: The yoke and matrix-frames stand normally at rest, as shown in Fig. 4, one frame being inclined and the other horizontal. The wires of the horizontal frame sustain at one end the assembled line of matrices which are in use. The operator manipulating the keys delivers the required matrices, one at a time, downward over the inclined wires into a common line between the converging guides H H', the key action at the same time determining the height at which each matrix shall stand in the line. The cams are then operated and the distribution of the type on the horizontal frame effected. The yoke is then revolved and the matrix-frames transposed, thus bringing into operative position the newly-assembled line and at the same time presenting the distributed matrices in position to permit the composition of a new line therefrom.

Motion may be imparted to the parts by any suitable arrangement of gearing. As shown in Fig. 2, the main shaft C receives motion through a bevel-gear $c'$, applied to its lower end and engaging a pinion $c^2$ on a shaft $c^3$, which is in turn provided with a stop-pinion $c^4$, receiving an intermitting motion from a stop-gear $c^5$ on the primary driving-shaft $c^6$. This gear $c^5$ also transmits an intermitting rotation, through stop-pinions $c^7$, to a bevel-pinion $c^8$, which in turn drives the pinion $c^9$, fixed to the shaft $c^{10}$, carrying both of the distributer-cams.

While I have described herein those details of construction which I consider best adapted for use under ordinary conditions, it is to be distinctly understood that many parts of my machine may be modified in detail or replaced by equivalent mechanisms without departing from the scope of my invention.

I believe myself to be the first to combine with a series of matrices each bearing several characters mechanism for conducting or transporting the matrices from the starting-point or magazines to the same alining-point and adjusting the matrices endwise in relation to each other, so as to determine which of the characters in each matrix shall be presented in the line, and to this combination I lay claim, broadly, in any form the equivalent of that herein described. Any mechanism which will bring the selected matrices each bearing a plurality of characters successively into line side by side and determine their longitudinal adjustment in the line is to be considered the equivalent of the mechanism shown. I also believe myself to be the first to construct in any form a machine with guiding-wires over which the matrices travel, the wire or guide being divided or constructed in two parts capable of instant separation from each other in the regular course of operation in order to admit of the matrix being applied to or removed from the wire at will.

I am aware that matrices have been mounted to slide to and fro on continuous guiding-wires fixed at both ends, so that the escape of the matrix was impossible; but I believe myself to be the first to make use of a matrix-guiding wire the ends of which may be exposed so as to permit the matrix to be discharged from or applied to the end of the wire at will, and this construction I broadly claim as my invention. I also believe myself to be the first to provide a machine with two independent sets of matrices arranged to travel on guides in the order of their selection and means for assembling matrices of the two sets independently. I also believe myself to be the first to construct a machine in which a single finger-key mechanism is adapted to coöperate with two matrix assembling or composing mechanisms alternately presented thereto. I also believe myself to be the first to construct a machine in which two sets of matrices each having its independent guides or supports are combined with means for presenting the mechanisms alternately in position to permit the assemblage or composition of the line and in position to coöperate with one and the same casting or impression mechanism.

The skilled mechanic will after reading this specification readily understand, therefore, that these combinations may be embodied in various forms to operate on essentially the same principle and with practically the same effect.

The spacing out of the assembled line of matrices to effect the justification of the line and to close the mold may be effected by means of solid spaces of suitable widths constructed and operated in the same manner as the matrices herein described, or space-bars having their lower ends composed of two wedge-shaped members dovetailed together to slide one upon another, as shown in Fig. 11, may be mounted and operated in the same manner as the matrices—that is to say, mounted on the wires and caused by the action of a finger-key to pass into line during the course of its composition at the proper point.

It is to be observed that the conducting of the matrices from the magazine or place of storage to a common place of assemblage or composition is an action distinct from that of adjusting the matrices longitudinally in relation to each other in the line. The expression "conducting the matrices to a place of assemblage or alinement" as used in this specification relates to the guidance or transportation of the matrices bodily one after another to the end of the line undergoing composition and is to be clearly distinguished from the longitudinal adjustment of the matrices in relation to each other and from the mere movement of a long matrix-bar back and forth longitudinally in order to move it into and out of the line, as practiced in my previous patent, No. 312,145.

Having thus described my invention, what I claim is—

1. In a linotype-machine, the combination of a series of matrices each having parallel sides and a series of characters of substantially equal width in one edge, less in number than the assortment used in the machine and constructed to be selected at random, assembled side by side in line, and adjusted endwise in relation to each other to bring into a common line a single character of each matrix.

2. In a linotype-machine, the combination of a series of matrices each bearing several distinct characters, and mechanism for selecting and conducting the matrices to a place of assemblage or alinement, and adjusting the matrices endwise individually in order to bring their selected characters, one on each matrix, into a common line.

3. In a linotype-machine, the combination of a group of duplicate matrices each having a series of characters in one edge, a series of wires or guides common to all the matrices in the group and leading to a common assembling-point, and mechanism for directing the matrices one at a time over one or another of the guides at will: whereby the position of the individual matrices on arriving at the assembling-point may be controlled so as to present one or another of the characters in operative position.

4. In a linotype-machine, a series of matrices each having a series of characters in one edge and parallel side faces, in combination with a finger-key mechanism and intermediate devices controlled by the finger-key mechanism for selecting the matrices, conducting them laterally one at a time to a place of assemblage or alinement, and for adjusting the individual matrices longitudinally: whereby the matrices are assembled and the selected characters one on each matrix brought into a common line for conjoint use.

5. In a matrix-machine the combination of a series of guide-wires arranged one above another, a matrix having a series of characters at different heights and a slotted arm which embraces the entire series of guide-wires, and means substantially as shown for adjusting said arm at will to travel upon one or another of the wires: whereby the matrix may be guided to an assembling-point at a higher or a lower level according as one or another of its characters is to be brought into use.

6. In a linotype-machine, and in combination with a matrix to travel thereon, the matrix-sustaining guide-wire having an exposed unconnected end to permit the application and removal of the matrix when the machine is in operative condition.

7. In a linotype-machine, and in combination with matrices sustained and guided thereby, a guide-wire fixed at one end in the supporting-frame, in combination with a support adapted for instantaneous connection with or disconnection from the free end of said wire, whereby the matrix may be permitted to pass to and from the wire substantially as described.

8. In combination with a matrix sustained thereby and movable lengthwise thereof, a supporting guide or wire consisting of two parts joined separably end to end: whereby the matrix is permitted to pass freely from one part to the other or to escape between the parts when they are separated.

9. A series of fixed guide-wires arranged in a vertical row or tier and a group or series of duplicate matrices to travel thereon, means for sustaining the group of matrices at the normal or starting point, and a finger-key mechanism to release the matrices one at a time and deliver them to one or another of the wires at will: whereby the successive matrices from the same group may be delivered side by side at different heights in order to present respectively different characters in operative position.

10. In combination with a group of duplicate matrices the matrix-guiding wires arranged in a vertical row or rank and each having a retractable end or continuation connected with a finger-key, each of said retractable ends adapted to retract the one next above it, an upper support on which the group of matrices is normally sustained, a finger-key to effect the discharge of the matrices one at a time from said support, and connections through which said support is operated by each of the other finger-keys: whereby the operation of any finger-key in the series is caused to release a matrix and effect its delivery to the corresponding wire.

11. In combination with the guide-wires F, arranged in a vertical rank or row their retractable ends provided with shoulders $f^{10}$, the finger-keys connected to the retractable members and the ejector $f^{12}$, arranged to be operated by all of the finger-keys.

12. In a linotype-machine, matrix-guiding wires arranged in a number of vertical rows or ranks, a series of groups of matrices those of each group slotted to embrace all the wires in one vertical row, finger-key mechanism for releasing the matrices one at a time and delivering the same to the different wires in each row, and guiding or alining devices: whereby the matrices traveling over the different wires are brought into a common line side by side.

13. In a linotype-machine, and in combination with the matrix-guiding wires each having an independently retractile end or continuation, a main frame to support said wires and a supplemental retractable frame wherein said retractile ends are adapted to slide independently: whereby the ends may be retracted one at a time or in series as occasion may demand.

14. In a linotype-machine, the combination of a series of matrices, a series of wires or guides whereon they slide to an assembling-point and mechanism substantially as shown for placing said wires first in an inclined position that the matrices may descend by gravity to the assembling-point and thereafter in a horizontal position that the assembled matrices may be presented in position for use.

15. In a linotype-machine, a series of matrices, a series of guide-wires whereon the matrices move to the assembling-point, a frame sustaining said wires and an inclined axis around which the frame revolves whereby the frame and wires are caused to assume alternately an inclined and a horizontal position.

16. In a linotype-machine and in combination with guide-wires arranged side by side, a series of pendent matrices movable along said wires toward the assembling-point, each matrix containing in its edge a plurality of characters, means for adjusting the matrices endwise in relation to each other to bring the selected characters in line and means whereby the matrices are guided into a common line notwithstanding the lateral separation of the wires from which they are suspended.

17. In a linotype-machine, the combination of the inclined rotary shaft, its crosshead, the two matrix-frames provided with matrix-sustaining wires or guides, and the annular track to sustain the free ends of the matrix-frames: whereby the matrix-frames are caused to revolve horizontally and thus exchange positions and also caused to move each from a horizontal to an inclined position.

18. In a linotype-machine, the combination of two series of matrices and an independent selecting and alining mechanism for each series, in combination with a fixed finger-key mechanism to which the two assembling mechanisms are alternately presented.

19. In combination with a stationary finger-key mechanism a rotary carrier provided with two independent series of matrices and composing mechanisms therefor, said mechanisms arranged to connect alternately with the finger-key mechanism as the carrier is revolved.

20. In a linotype-machine, the combination of a mold, a finger-key mechanism, and an intermediate rotary carrier provided with two independent sets of matrices and assembling or composing mechanisms therefor: whereby the two composing mechanisms are presented alternately to the finger-key mechanism and the assembled matrices in one mechanism presented to the mold during the composition or asemblage of a new line in the other mechanism.

21. In combination a series of matrix-bars each containing a plurality of separate characters, means for holding said matrices in storage, a mold, means for selecting the matrices and guiding the selected matrices laterally and successively to an assembling-point side by side, and means for determining the longitudinal adjustment of the matrices in relation to each other to secure the alinement of the selected characters thereon.

22. In a linotype-machine the combination of matrix-bars each containing a plurality of characters independently usable, a mold, guides on which the matrices are movable back and forth from the storage-points to the mold, finger-keys, and connection from said keys to release in any order desired the matrices bearing the selected characters and determine the longitudinal relations of said matrix-bars to each other in front of the mold; whereby the matrices may be guided from the storage-points and arranged to present their selected characters, one on each bar, in a common line in front of the mold.

23. In a linotype-machine two shifting composing mechanisms and a single series of finger-keys arranged to actuate said mechanisms alternately.

24. In a linotype-machine two composing mechanisms, a single series of finger-keys arranged to actuate said mechanisms alternately, matrices composed by the respective mechanisms in successive lines, and a mold to which all the composed lines are presented.

25. In a linotype-machine the combination of a series of matrix-bars each containing a plurality of separate characters less than the assortment used in the machine, means controlled by finger-keys for selecting the bars, assembling them side by side one after another and adjusting them endwise to aline their individual selected characters, and means for distributing the matrices.

26. In a linotype-machine matrix-bars each suspended and arranged to travel laterally on a wire or guide, and each having in one edge a plurality of separate characters, finger-key mechanism to release the designated bars one at a time in the order in which they are to be used, a mold, a guide or alining device to bring the selected and composed matrices into alinement in front of the mold, and means for determining the longitudinal relations of the matrices in the line.

27. In a linotype-machine a series of matrix-bars, each having a plurality of independently-usable characters at one edge and the means of suspension at the top, in combination with a series of guides whereon the matrices are mounted to travel laterally; whereby like matrices may be sustained at different heights, in order to present different characters at the alining-level.

28. In a linotype-machine a matrix having a plurality of separate characters in combination with guides at different levels, along which the matrix may be advanced laterally to present one or another of its characters at the alining-level as demanded.

29. In a linotype-machine matrix-bars each bearing a series of characters, means for holding or storing said matrix-bars, and means for selecting the desired bars and conducting them laterally into a common line, a mold and means for adjusting the bars endwise in order to bring the desired characters, one on each bar, into a common line in front of the mold.

30. A font of linotype-matrices, comprising a series of matrix-bars adapted to be assembled conjointly in different combinations, each having in one edge a series of unlike characters, independently usable, and less than the assortment represented in the font.

31. In a linotype-machine a rotary frame, matrices carried therein, two alining devices in said frame to receive successive and independent composed lines of matrices, and a mold to which the sucessive lines are presented by the rotation of the frame.

32. In a linotype-machine having suitable operating mechanism, the combination of a series of matrices, constructed to be assembled side by side in different orders to form the impression-line, each matrix having several different characters less in number than the assortment used in the machine, the characters being independently usable.

33. In a linotype-machine, a series of matrices, each having an assortment of characters less than the whole number in the machine, mechanism for selecting said matrices, assembling them in line and determining their longitudinal adjustment in relation to each other in order to bring the selected characters, one on each matrix, into a common line, mechanism for subsequently adjusting the matrices longitudinally to a common level preparatory to distribution, and a distributing mechanism.

34. In a linotype-machine a series of matrices each bearing a plurality of separately-usuable characters, said matrices being adjustable longitudinally in relation to each other in order to bring the selected characters into a common line and a mechanism for subsequently adjusting the assembled matrices endwise in relation to each other to adapt them for delivery to a distributing mechanism, substantially as described and shown.

35. In a linotype-machine the combination of means for holding a series of matrices, an escapement device to release the matrices one at a time, and a spring acting to accelerate the motion of the matrices when released.

36. In a linotype-machine, a mold, two duplicate sets of matrices to coöperate with said mold, a sustaining and composing mechanism for each set of matrices, and means for alternating the positions of said mechanisms and presenting each in position to allow the composition of a line from one set of matrices while a composed line from the other set is in operative relation to the mold.

37. In a linotype-machine, two independent sets of matrices, mechanism for composing matrix-lines from the two sets alternately, a mold and means for presenting the matrix-lines successively to the mold in the order of their composition.

38. In a linotype-machine, two free or unattached sets of matrices, guides for each set adapted to direct the matrices successively in the order of release to a common assembling-point, and a key mechanism arranged to select and release matrices from the two sets alternately, a line from one side and then a line from the other.

In testimony whereof I hereunto set my hand, this 15th day of December, 1890, in the presence of two attesting witnesses.

OTTMAR MERGENTHALER.

Witnesses:
PH. H. HOFFMAN,
J. A. O. TUCKER.

It is hereby certified that the assignee in Letters Patent No. 614,229, granted November 15, 1898, upon the application of Ottmar Mergenthaler, of Baltimore, Maryland, for an improvement in "Linotype-Machines," was erroneously described and specified as "The Mergenthaler Linotype Company, of New Jersey," whereas said assignee should have been described and specified as *Mergenthaler Linotype Company, a corporation of New York*, as shown by the records of assignments of this office; and that the said Letters Patent should be read with this correction therein that the same may conform to the record of the case in the Patent Office.

Signed and sealed this 1st day of July, A. D., 1913.

[SEAL.]

C. C. BILLINGS,
*Acting Commissioner of Patents.*